Patented Nov. 21, 1922.

1,436,179

UNITED STATES PATENT OFFICE.

JOHAN HJALMAR LIDHOLM, OF WARGON, SWEDEN.

METHOD OF PRODUCING CYANAMIDE FROM CALCIUM CYANAMIDE.

No Drawing.   Application filed January 10, 1921.   Serial No. 436,346.

*To all whom it may concern:*

Be it known that I, JOHAN HJALMAR LIDHOLM, a citizen of the Kingdom of Sweden, residing at Wargon, Sweden, have invented a new and useful Method of Producing Cyanamide from Calcium Cyanamide, of which the following is a specification.

In producing cyanamide from calcium cyanamide by treating the calcium cyanamide with water and carbon dioxide it is difficult to avoid the forming of dicyandiamide, inasmuch as the solution before the calcium has been precipitated by the carbon dioxide will be strongly alkaline, the cyanamide, as is well-known, being rapidly polymerized to dicyandiamide in alkaline solution. The hydroxyl ions of the solution seem in such case to act catalytically and perform the conversion without partaking themselves in the reaction.

In my Patent No. 1,380,223 I have already proposed to prevent the conversion of the cyanamide into dicyandiamide by gradually adding the calcium cyanamide to the water solution while simultaneously supplying carbon dioxide for precipitating the calcium. Also in such method it may happen that the result will not be fully satisfactory. My investigations on the conversion of the cyanamide into dicyandiamide in alkaline solution have given the explanation of the said unfavorable result. It has been found that the velocity of reaction in this conversion is about proportional to the concentration of the cyanamide in the solution if the alkalinity is low but that on the other hand it is rapidly increased if the alkalinity exceeds a certain limit so that at an alkalinity of 0.5-normal or more it is approximately proportional to the square of the concentration of the cyanamide. By alkalinity is to be understood the total amount of base present, such as is found by titration with methyl-orange as indicator.

The consequence of this fact is evident. If the alkalinity of the solution is allowed to increase too much a considerable percentage of the cyanamide is converted into dicyandiamide. It has thus been found that for instance at 45° C. about 30% of the cyanamide in a 10% solution is converted into dicyandiamide during one hour if the alkalinity of the solution is 0.5-normal. If the alkalinity of the solution is greater, for instance 1-normal, about 60% of the cyanamide is converted under the same conditions. If on the contrary the alkalinity of the solution is less than 0.5-normal, for instance 0.1 to 0.2-normal, only a small per cent of the cyanamide is converted into dicyandiamide under the same conditions.

For preventing the conversion of cyanamide to a greater extent into dicyandiamide it was hitherto necessary to produce rather dilute solutions of cyanamide whereby the technical working of the method was uneconomical. It has further been proposed to use an effective cooling. This method has however its limits, inasmuch as at a low temperature cyanamide-carbonate of calcium is precipitated, making the treatment with carbon dioxide difficult by giving the reaction mixture a too thick consistency. For decomposing the cyanamide-carbonate of calcium the temperature must again be raised and then dicyandiamide is formed in large quantity.

This invention relates to an improved method of producing rather concentrated solutions of cyanamide from calcium cyanamide practically free from dicyandiamide by gradually supplying the calcium cyanamide to the reaction mixture while simultaneously supplying carbon dioxide for precipitating the calcium. The invention consists, chiefly, in that the supply of the calcium cyanamide and the supply of the carbon dioxide are regulated in relation to each other in such manner that the alkalinity of the mixture always is held below 0.5-normal, thus preventing any considerable conversion of the cyanamide into dicyandiamide. To check the alkalinity, samples are drawn from the re-action mixture, filtered and titrated with an acid, methyl orange being used as an indicator. The reaction is preferably performed with a moderate cooling so that the temperature will not fall below 30° C. The carbon dioxide may be supplied in a pure state or as gases containing carbon dioxide and is brought effectively to act upon the reaction mixture by intensively mixing and finely dividing the stream of carbon dioxide into the reaction mixture. In this manner it is possible to produce at a low cost cyanamide solutions with up to 15% cyanamide and a very low percentage of dicyandiamide, which solutions may be used for producing urea and other products of conversion of cyanamide. The solution is separated from the mud by filtering whereupon the mud is washed with pure water, the dilute solution obtained in the latter operation being preferably used as solvent in prosecuting the process.

I claim:—

1. Method of producing cyanamide, consisting in gradually supplying calcium cyanamide to a water solution and simultaneously supplying carbon dioxide to such extent that the alkalinity of the solution during the reaction is maintained below 0.5-normal.

2. Method of producing a cyanamide solution practically free from dicyandiamide, consisting in gradually supplying calcium cyanamide to a water solution and simultaneously supplying carbon dioxide to such extent that the alkalinity of the solution is maintained below 0.5-normal, and moderately cooling the reaction mixture so as to maintain a temperature not less than 30° C.

In testimony whereof I have signed my name.

JOHAN HJALMAR LIDHOLM.